United States Patent [19]

Griffaton

[11] Patent Number: 5,089,684
[45] Date of Patent: Feb. 18, 1992

[54] TOOLING FOR WORKING WITHIN A TUBULAR ELEMENT

[75] Inventor: Jacques Griffaton, Chalon S/Saone, France

[73] Assignee: Framatome, Courbevcie, France

[21] Appl. No.: 544,940

[22] Filed: Jun. 28, 1990

[30] Foreign Application Priority Data

Jun. 28, 1989 [FR] France .................. 89 08635

[51] Int. Cl.⁵ ............................................. B23K 26/00
[52] U.S. Cl. ........................... 219/121.63; 219/121.78; 376/260
[58] Field of Search ............... 219/121.63, 121.64, 219/121.78, 121.79; 376/260

[56] References Cited

U.S. PATENT DOCUMENTS

| 4,080,525 | 3/1978 | Gobetz ...................... 219/121.6 |
| 4,839,495 | 6/1989 | Kitera et al. ................. 215/121.63 |
| 4,978,834 | 12/1990 | Griffaton ..................... 219/121.63 |
| 4,983,796 | 1/1991 | Griffaton ..................... 219/121.63 |

FOREIGN PATENT DOCUMENTS

| 871236 | 2/1979 | Belgium . |
| 0027388 | 4/1981 | European Pat. Off. . |
| 2598950 | 11/1987 | France . |

*Primary Examiner*—C. L. Albritton
*Attorney, Agent, or Firm*—Pollock, VandeSande & Priddy

[57] ABSTRACT

The frame (9), which is positioned in relation to the tubular element (T), comprises disengagable means (40) for driving the working rod (18) in rotation, and these means can co-operate with at least two regions (26 to 28) of the rod. It is thus possible to work in a plurality of different zones of the tubular element. Application to the sleeve coupling by laser welding of the steam generator tubes of pressurized-water nuclear reactors.

8 Claims, 4 Drawing Sheets

FIG. 1A  ## FIG. 1B
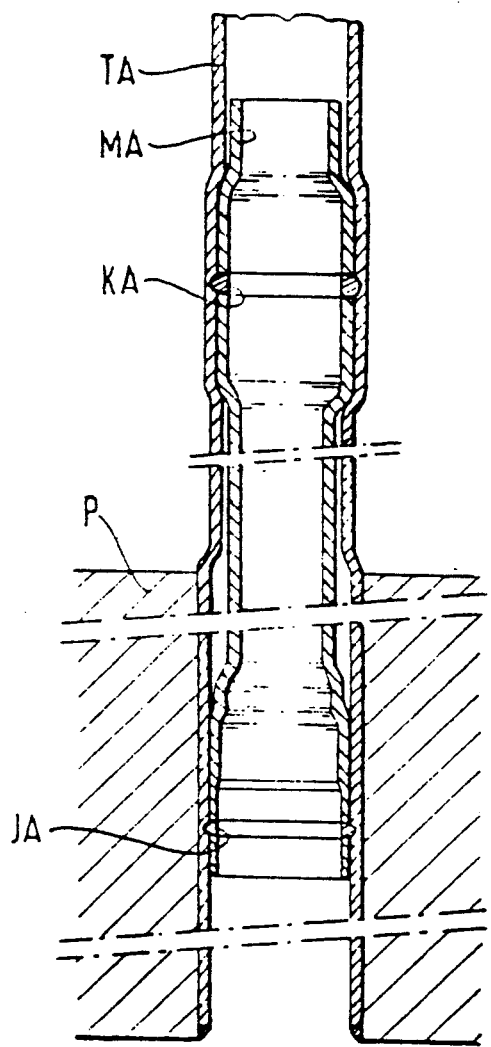
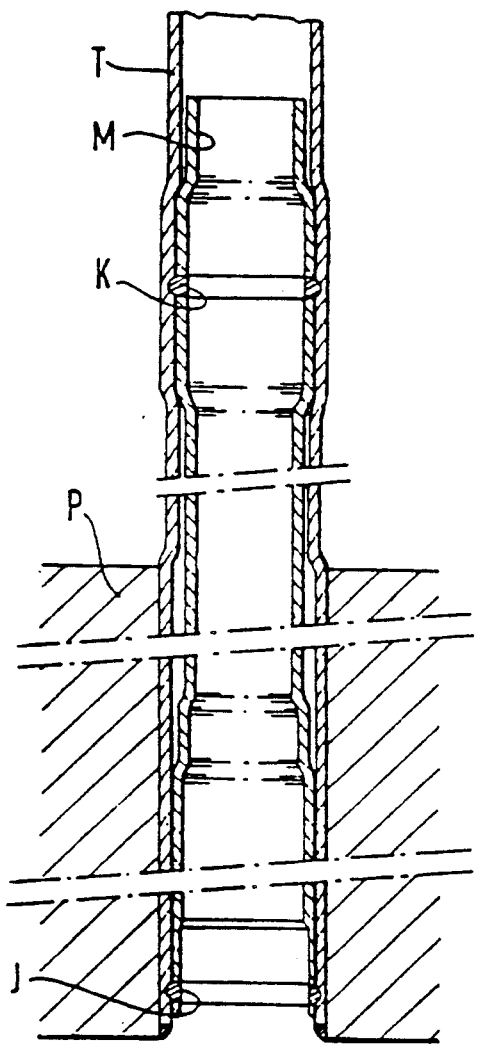

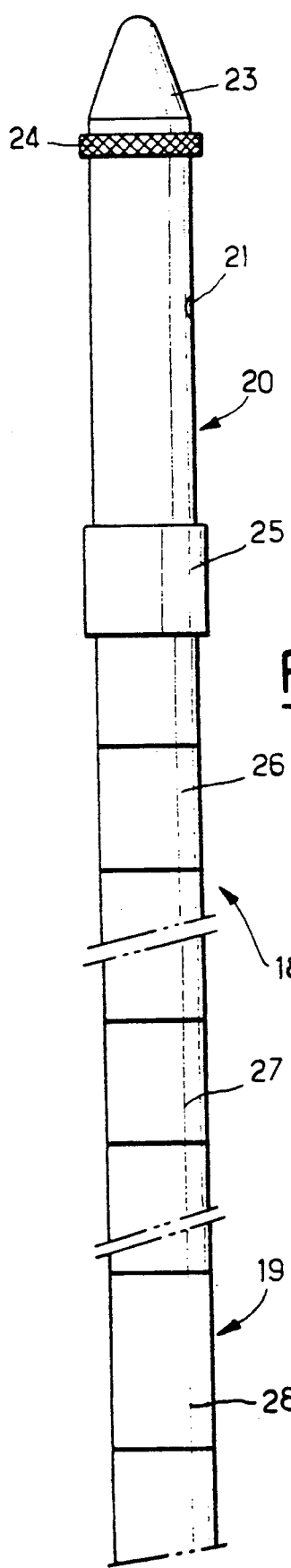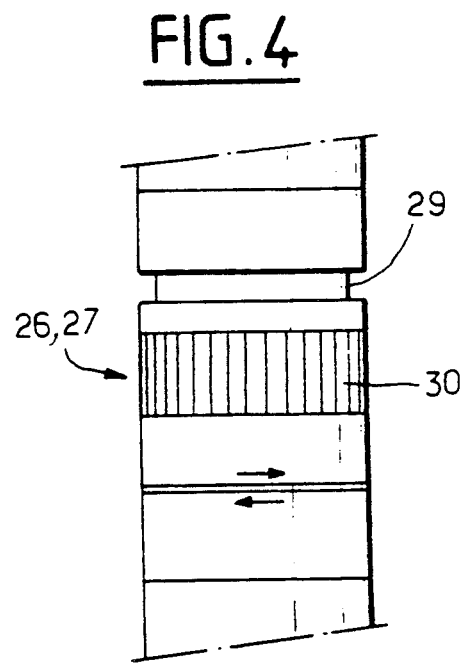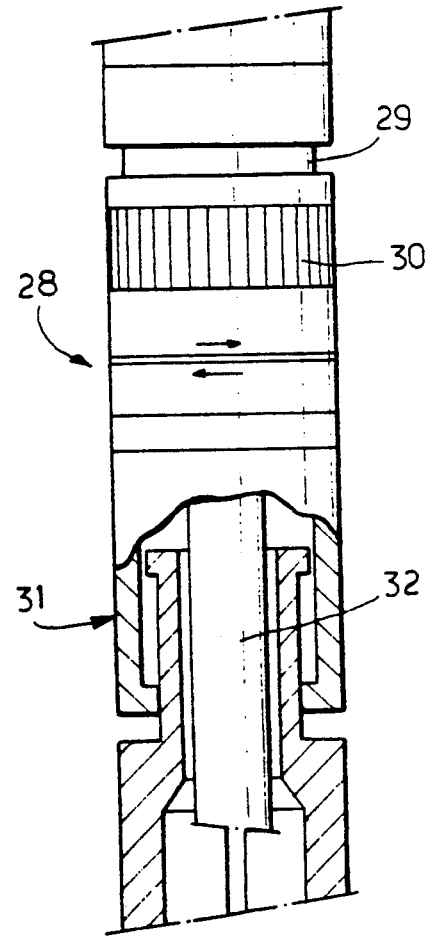

TOOLING FOR WORKING WITHIN A TUBULAR ELEMENT

FIELD OF THE INVENTION

The present invention relates to a tooling for working within a tubular element, of the type comprising a rod which comprises at its front end a rotary working head equipped with means for centering within the tubular element, and a frame traversed by the rod and equipped with means for positioning in relation to the tubular element, this frame being equipped with means for driving the rod in rotation. It is applicable, in particular, to the restoration of the sealing of the steam generator tubes of a pressurized-water nuclear reactor.

BACKGROUND OF THE INVENTION

The steam generators of pressurized-water nuclear power stations generally comprise a bundle consisting of a very large number of tubes of small diameter which are curved in a U and fixed at each of their ends by crimping in a thick tube plate. That part of the steam generator situated below the tube plate constitutes a water reservoir within a first part of which the pressurized "primary" water coming from the vessel of the reactor is distributed within the tubes of the bundle. In a second part, the water which has circulated in the tubes is recovered, in order to be sent back, through a conduit of the primary circuit of the reactor, into the vessel enclosing the core formed by the fuel assemblies ensuring the heating of the pressurised water. The feed water of the steam generator comes into contact with the external surface of the tubes of the bundle, in that part of the steam generator situated above the tube plate, in order to be converted there into steam, and this steam is sent to the turbine associated with the nuclear reactor.

The walls of the tubes of the bundle thus constituted a barrier between the pressurised water constituting the primary fluid of the reactor and the feed water constituting the secondary fluid. The primary fluid which comes into contact with the fuel assemblies and the internal structures of the vessel of the reactor contains radioactive products. It is thus appropriate to avoid placing of the primary fluid in contact with the secondary fluid, the contamination of which might have very undesirable consequences. To this end, it is necessary to avoid to the greatest possible extent the appearance of leaks through the walls of the tubes of the bundle of the steam generator and to repair as quickly as possible and in an effective manner any tubes, the wall of which is pierced.

Such repairs are generally necessary during the normal service life of the reactor. In fact, as a result of the stresses of thermal and mechanical origin or of the corrosion suffered by the tubes of the bundle, cracks may be formed in the walls of the tubes of the bundle, both on the primary side and on the secondary side. These repairs are carried out during maintenance of the nuclear reactor.

A process is known for repairing the tubes of the bundle of a steam generator by sleeve coupling of these tubes at the location of the defect involving a loss of sealing. A sleeve having an external diameter slightly less than the internal diameter of the tube to be repaired and having a length which is sufficient to cover the defective zone is introduced into the tube, by the entrance face of the tube plate on which the ends of the tubes are aligned. It is placed thereat, in such a manner as to be aligned with the entrance face of the tube plate for the tubes situated in the central part of the latter, or at mid-thickness of the tube plate for the tubes situated at the periphery of the latter. It is then fixed within the tube in such a manner as to effect two sealed joints between itself and the tube on either side of the defective zone.

Numerous methods are known for effecting the fixing of the sleeve on either side of the defective zone. In particular, it is known to effect diametric expansion of the sleeve in two zones close to its ends situated, in the case of one of them, within the thickness of the tube plate and, in the case of the other, beyond the exit face of the tube plate, this taking place after cleaning of the tube in these two zones. The expansion may be obtained either by hydraulic or by mechanical methods, such as rolling in, or by expansion by explosion, or by welding or brazing.

All these operations necessitate the taking of action within the water reservoir of the steam generator, i.e., within a part of this generator which has been in contact with the primary fluid loaded with radioactive products, during the operation of the reactor, and where a human operator is subjected to a high degree of radioactivity.

Automatic and remotely controlled devices have thus been proposed, which are capable of effecting at least partially the operations required for the sleeve coupling of the tubes.

There are known, for example, a process and a device permitting the installation, within a leaky generator tube, of a sleeve from the exterior of the water reservoir. This process and this device have formed the subject of the patent application FR 2,598,209. The sleeve is introduced into the tube from the exterior of the water is introduced into the tube from the exterior of the water reservoir by a flexible tube referred to as a boa, on a double hydraulic expander with which the approach within the tube is performed: after a sufficient expansion effected in the two zones situated at the ends of the sleeve by inflation of the elastic membranes of the double expander, the sleeve remains positioned within the tube.

The membranes are then decompressed and the expander is withdrawn from the sleeve. The fixing tools, top tube expander and bottom tube expander, are then successively introduced by the same flexible component into the sleeve, respectively into the top zone and then into the bottom zone, in order to effect the fixing of the sleeve by an operation of rolling in.

The disadvantage of this method is that it does not permit the production of rigorously sealed fixings of the sleeve.

In order to remedy this disadvantage, it is known to effect the fixing by laser welding of the sleeve in the tube at each end of the sleeve.

Applicant's application FR 2,637,829 proposes a tooling of the type indicated above, in which the laser is of the YAG type and its beam is conveyed by an optical fiber.

SUMMARY OF THE INVENTION

The object of the invention is to permit working in a plurality of zones of the tubular element by means of a tooling which is reliable and requires little space.

To this end, the subject of the invention is a tooling of the aforementioned type, in which the means for driving in rotation are adapted to cooperate selectively with at least two driving regions of the rod axially spaced from one another, and are equipped with means for engagement-disengagement in relation to this rod, the tooling further comprising means for the longitudinal advance of the rod which are situated remotely, to the rear in relation to the means for driving in rotation.

BRIEF DESCRIPTION OF THE DRAWINGS

An illustrative embodiment of the invention will now be described with reference to the accompanying drawing, in which:

FIGS. 1A and 1B are longitudinal cross sections of two variants of sleeves used for the implementation of the invention;

FIG. 3 is a front elevation of the rod of this tooling on a larger scale;

FIGS. 4 and 5 show, on a larger scale, two details of this rod;

DESCRIPTION OF PREFERRED EMBODIMENT

FIGS. 1A and 1B show two types of sleeves used for repairing nuclear reactor steam generator tubes;

FIG. 1A shows a longitudinal cross-section of a sleeve MA used for repairing tubes such as TA which are situated within the periphery of a tube plate P. A weld seam JA constitutes the lower joint situated towards the mid-thickness of the plate P.

FIG. 1B shows a cross-section, in elevation, of a long sleeve used for repairing tubes situated within the central part of the tube plate P: this applies in the case of 80% of the tubes. The lower joint J is situated near the lower face of the plate.

The upper joint KA or K is, in both cases, situated beyond the upper face of the plate P, near to the upper end of the sleeve.

Figure 2:
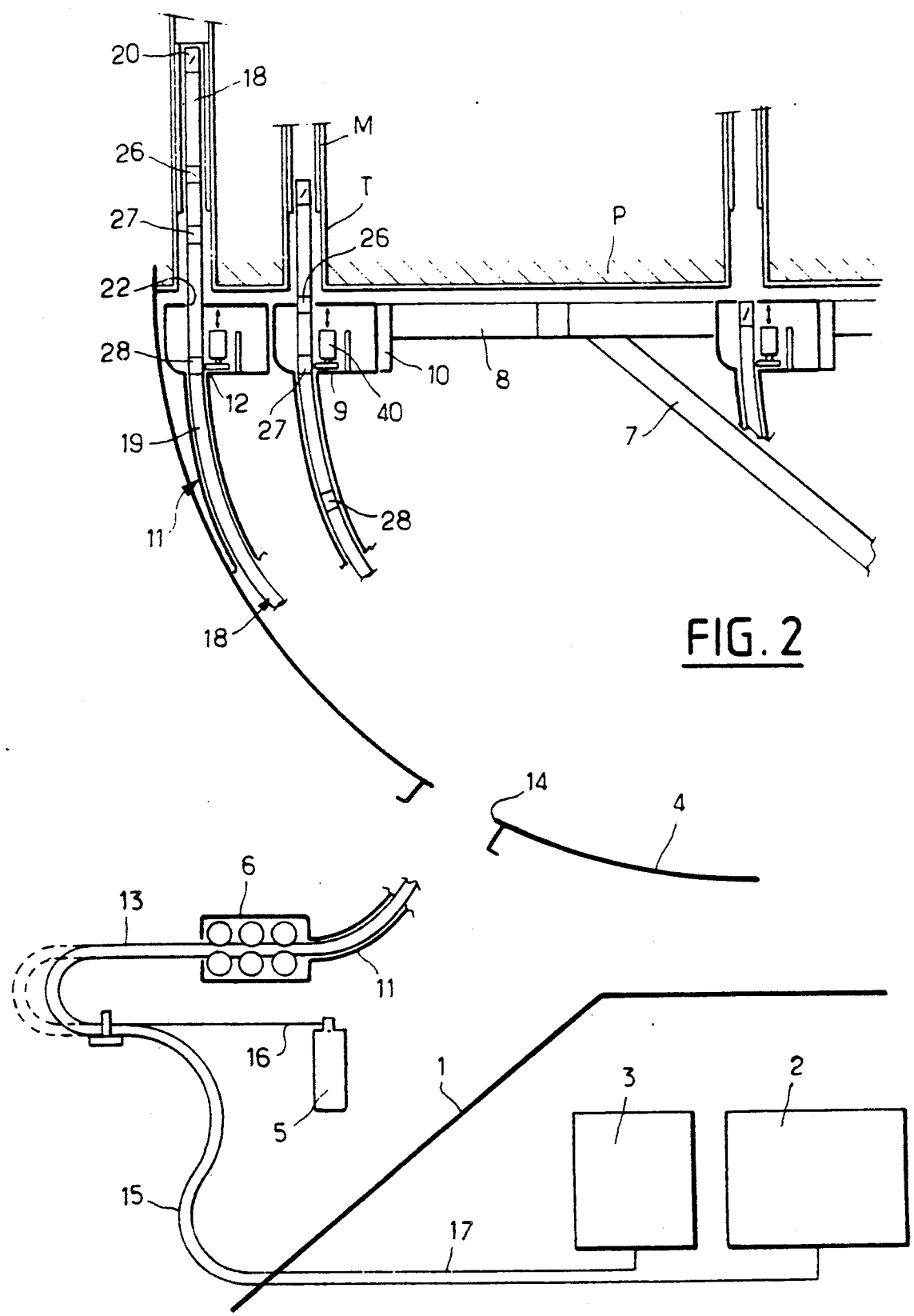
FIG. 2 is a front elevation of the assembly of a tooling according to the invention.

The tooling represented in its entirety in FIG. 2 is intended to effect automatically the two welds JA, KA or J, K of a sleeving. This tooling comprises:

outside the reactor building 1, a YAG laser 2 and an electrical supply cabinet 3;

in the reactor building outside the water reservoir 4 of the reactor, a source of inert gas 5 and a push-pull 6; and in the water reservoir, a carrier, the arm 8 of which carries a frame 9 at its end, by means of an elevator 10.

A flexible tube 11 referred to as a boa extends from a lower opening 12 of the frame 9 to the push-pull 6, traversing the manhole 14 of the water reservoir. Within this boa passes a sheath 13 containing a sheathed optical fibre 15 originating from the laser 2, a gas conduit 16 fed by the source 5, and electrical cables 17 originating from the cabinet 3, the sheath constituting a rear extension of a welding rod 18.

The rod 18 comprises a flexible rear part 19 of great length and ends towards the front in a rigid welding head 20.

The welding head comprises an optical cell adapted to deflect radially through a lateral window 21 (FIG. 3) the laser beam carried by the optical fiber, this beam being focused by the optical cell onto the wall to be welded. An example of the welding head is described in detail in the aforementioned patent application FR 88/13,602. FIG. 2 shows the rod 18 in two active positions corresponding to the two welds, top and bottom, to be performed, in which the rod traverses an upper opening 22 of the frame 9, as well as in a third, retracted position permitting the displacement of the arm 8 from one tube to be sleeve-coupled to another.

FIG. 3 represents the rod 18 in an external view, with its front or upper end ogive 23 equipped with a centering brush 24, a centering ring 25 situated below the window 21 and, below the ring 25, three rigid regions for driving in rotation 26 to 28, which are axially spaced from one another.

Figure 6:
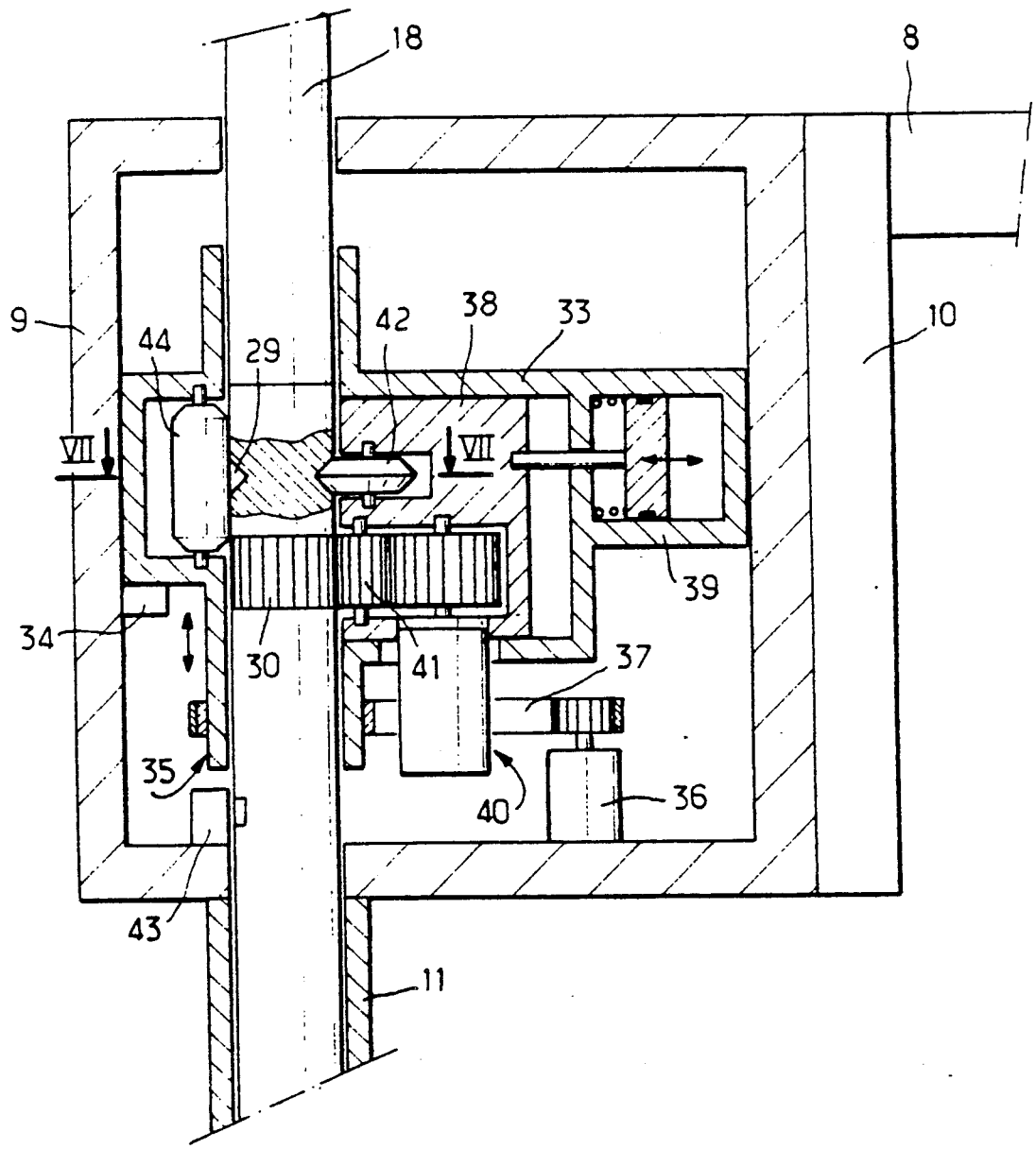
FIG. 6 is a view, in cross-section, of part of the tooling.

The two upper regions 26 and 27 are identical. As represented in FIG. 4, each of them comprises a circular throat 29 and, below the latter, a pinion ring 30 mounted by means of a one way clutch. The lower region 28 (FIG. 5) comprises the same elements and, in addition, under the pinion, a double telescopic sleeve 31 permitting axial movement slightly greater than the displacement of the welding head necessary in order to effect a plurality of close circular weld seams jointly constituting a welded joint. The sheath 32 of the optical fiber is immobilized against rotation, the pinion ring 30 of the region 28 and the parts of the rod which are situated above being mounted for rotation in relation to this sheath. By virtue of the three free wheels, the driving in rotation of pinion 30 causes the rotation of this pinion and of the entire part of the rod situated above, while the part of the rod situated below this pinion remains immobile in rotation. As can be seen in FIG. 6, the frame 9 contains a moveable chassis 33 mounted to slide vertically between a low position, defined by an abutment 34 of the frame, and a high position, defined by the coming of the chassis into abutment on the upper wall of the frame. The upward displacement of this chassis 33 is obtained by means of a screw-nut system driven by a motor 36 via a belt 37.

Within the chassis 33 there is mounted for radial sliding movement (in relation to the axis of the rod) a secondary chassis 38 actuated by a fluid jack 39. The chassis 38 carries a drive reduction gear set 40 comprising a drive pinion 41 adapted to engage with a pinion 30 and, above the pinion 41, a flat idle roller 42, the peripheral surface of which is conjugated with the throats 29.

The operation is as follows.

At the outset, the chassis 33 is in the low position and the secondary chassis 38 is in the inactive position, i.e., the position displaced towards the right in relation to the position illustrated in FIG. 6. The pinion 41 and the roller 42 are then completely released from the envelope cylinder of the rod.

The frame 9 is positioned by the arm 8 of the carrier in front of the tube T to be repaired, and the elevator 10 applies the frame 9 against the tube plate P. The sleeve to be welded M has previously been attached in the tube by a known technique, and the corresponding tooling has been withdrawn from the boa.

The rod 18 is introduced into the boa and the push-pull 6 causes it to advance as far as into the high position corresponding to the upper weld to be performed, this position being determined by a detector 43 provided in the frame 9. The region 28 is then situated in the chassis 33.

Figure 7:
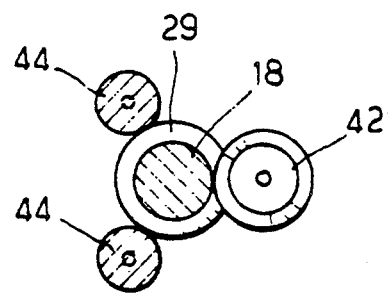
FIG. 7 is a cross-section taken on the line VII—VII of FIG. 6.

The jack 39 is actuated so that the pinion 41 engages with the pinion 30, which faces it, and so that the roller 42 simultaneously engages into the throat 29, as represented in FIG. 6. The rod, moreover, is supported on two cylindrical rollers 44 which turn in the chassis 33, at the height of the roller 42 and at 120° from the latter (FIG. 7).

The motor 36 is actuated; this causes rising of the chassis 3 and, via the roller 42, the rod 18, as far as the level corresponding to the first weld seam to be performed. The welding laser beam is initiated and the drive reduction gear 40 causes the rod to execute a rotation of 360°.

The motor 36 then causes the chassis 33 and the rod to redescend as far as the level of the following seams to be formed, for example of 0.5 mm. The laser beam is again initiated, the drive reduction gear 40 causes the rod to turn through 360°, and so on.

When the first joint, which comprises, for example, five seams, is completed, the chassis 33 is brought back to the low position, the chassis 38 is brought back to the inactive or disengaged position by displacement towards the right in FIG. 6, and the push-pull 6 causes descent of the rod over a distance corresponding to the spacing of the two joints to be made. The region 27 or the region 26 of the rod is then situated in the chassis 33, according to the level of the second joint JA or J (FIG. 1A or FIG. 1B). The weld seams of the second joint are then made as described above.

It should be noted that the axial movement, of the order of 15 mm, which is necessary in order to effect the seams of each joint, is made possible by the presence of the double telescopic sleeve 31 in the region 28. In a variant, the clearance of the rod in the boa may be sufficient to permit this movement.

The invention can be applied to various types of work to be carried out within a tube. Moreover, it is easily possible to choose the number and the longitudinal position of the driving region or regions, in dependence upon the work to be carried out in the tube.

I claim:

1. Tooling for working within a tubular element, of the type comprising a rod (18) which comprises, at its front end, a rotary working head (20) equipped with means (24, 25) for centering within said tubular element, and a frame (9) traversed by said rod and equipped with means (8) for positioning in relation to said tubular element, said frame being equipped with means (40) for driving said rod in rotation, means for driving in rotation (40) selectively cooperating with at least two driving regions (26 to 28) of the rod axially spaced from one another and equipped with means (38, 39) for engagement-disengagement in relation to said rod, said tooling further comprising means (6) for longitudinal advance of said rod which are situated remotely, to the rear in relation to said means for driving in rotation.

2. Tooling according to claim 1 wherein said rod (18) comprises a plurality of sections connected to one another by free wheels corresponding to each drive region (26 to 28).

3. Tooling according to claim 1, wherein said frame (9) comprises a chassis (33) moveable in axial translation, means (35 to 37) for driving said chassis and means (42) for selective coupling of said chassis to said rod.

4. Tooling according to claim 3, wherein said selective coupling means (42) are combined with said engagement-disengagement means (38, 39).

5. Tooling according to claim 4, wherein said means for driving in rotation comprise a drive reduction gear set (40) carried by a secondary chassis (38) which is moveable radially within said frame (9) in relation to said rod (18), and wherein said selective coupling means comprise a roller (42) cooperating with a circular throat (29) of said rod and turning on an axis parallel to said rod and carried by said secondary chassis.

6. Tooling according to claim 5, wherein said secondary chassis (38) is mounted within said moveable chassis (33).

7. Tooling according to claim 1, wherein said drive region (28) which is furthest from said working head (20) comprises a telescopic link (31).

8. Tooling according to claim 1, for laser working, wherein said working head (20) comprises an optical cell which itself comprises means for focusing and for optical deflection to receive a light beam along an axis of said head and to deflect that beam focused on a point of impact of said wall of said tubular element, and means for conveying the laser beam of said laser (2) to said optical cell.

* * * * *